United States Patent Office 3,377,321
Patented Apr. 9, 1968

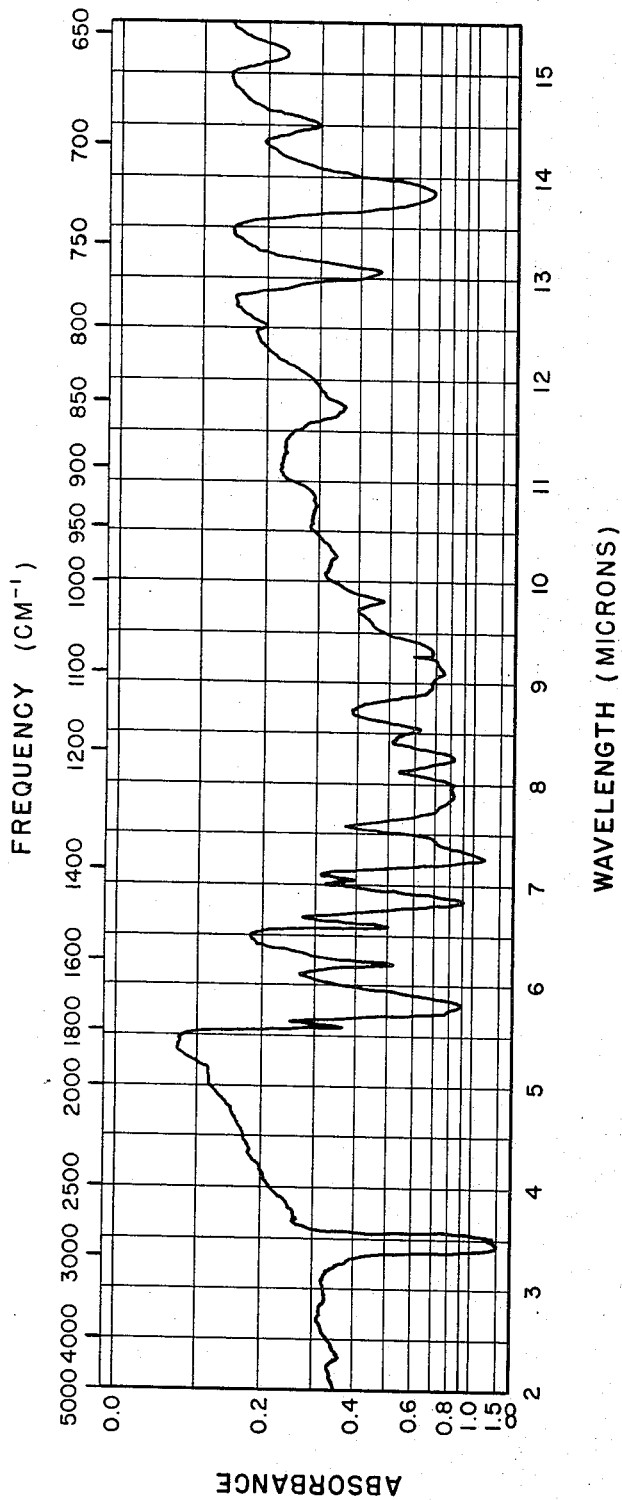
INVENTORS.
Richard E. Van Strien
James R. Eiszner

3,377,321
POLYESTER-IMIDE POLYMERS AND A PROCESS FOR PREPARING POLYESTER-IMIDE POLYMERS FROM AROMATIC CARBOXYLIC ACIDS
Richard E. Van Strien, Griffith, Ind., and James R. Eiszner, North Muskegon, Mich., assignors to Standard Oil Company, Chicago, Ill., a corporation of Indiana
Continuation-in-part of application Ser. No. 429,126, Jan. 29, 1965, which is a division of application Ser. No. 290,292, June 25, 1963. This application Apr. 7, 1967, Ser. No. 629,188
2 Claims. (Cl. 260—75)

ABSTRACT OF THE DISCLOSURE

This invention discloses novel polyester-imide polymers prepared from aromatic dicarboxylic acids having an internal imide group and saturated dihydric alcohols. These polymers are useful as surface coatings and fibers.

---

This application is a continuation in part of application Ser. No. 429,126 filed Jan. 29, 1965, which in turn is a division of application Ser. No. 290,292 filed June 25, 1963, now U.S. Patent No. 3,217,014.

This invention relates to novel aromatic dicarboxylic acids having an internal imide group and polyester-imides prepared therefrom, and more particularly to novel aromatic dicarboxylic acids of the formula:

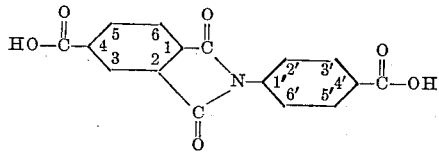

and polyester-imides prepared therefrom, especially those prepared from saturated dihydric alcohols.

Polyesters, prepared from dicarboxylic acids such as terephthalic acid and dihydric alcohols such as ethylene glycol, have been employed in preparing surface coatings for electrical wires, etc., and fibers for aircraft tires, etc., which have been subjected to elevated temperatures. However, these products from the polyesters have not always been entirely satisfactory in that they tend to deteriorate under the effects of higher temperatures. Therefore, new coatings and fibers are desired to withstand higher temperatures.

It has been discoverd that an aromatic dicarboxylic acid of the formula:

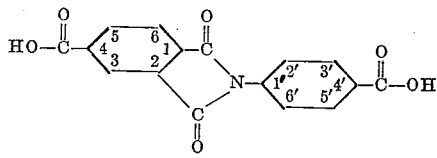

when reacted with a saturated dihydric alcohol, particularly one having from about 2 to 4 carbon atoms, produces a polyester-imide which as a coating or fiber exhibits highly desirable properties at elevated temperatures.

In order to clearly locate the position of each carboxyl group in the aromatic dicarboxylic acid, the formula for the dicarboxylic acid may be represented by:

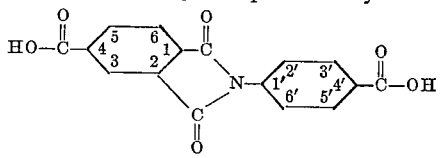

It is understood that the carboxyl group on each of the aromatic groups may be in any one of the open positions. However, it is preferred that at least one is in the para position and especially preferred that both are in the para position resulting in N-(p-carboxyphenyl) trimellitimide.

The aromatic dicarboxylic acid is reacted with a dihydric alcohol to produce the polyester-imide. Normally, the alcohol is saturated and preferably has from 2 to about 4 carbon atoms since these are so readily available and have been utilized advantageously in the past for polyester products. Desirable alcohols include ethylene glycol, propylene glycol, butylene glycol, diethylene glycol and the like. Ethylene glycol is preferred because of the desirable polymers produced from it.

The product of the aromatic dicarboxylic acid and dihydric alcohol is a polyester-imide polymer made up substantially of the following units:

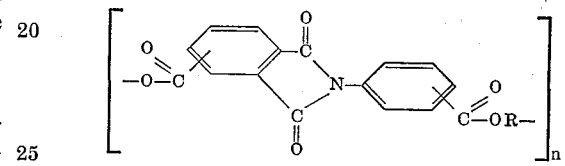

where $n$ is greater than 1 and R is the residue from the dihydric alcohol, preferably a saturated dihydric alcohol.

The infrared absorption spectra clearly supports this polymer structure. The infrared structure can be seen in FIGURE 1. The infrared absorption spectra shows no evidence of the presence of free carboxylic acid groups. The predominant absorption bands in the spectrum are due to cyclic imide carbonyls and ester carbonyls. This is consistent with the formula shown above. The important absorption bands for the polymer are at 5.6, 5.8 and 7.26 microns for the cyclic amide groups and at 5.8, 7.9 and 8.6 microns for the aryl ester groups. The absorption at 13.86 is probably due to a deformation of vibration of the cyclic imide.

Naturally, the position of the carboalkoxy groups on the acidic residue in the polyester-imide depends on the particular dicarboxylic acid employed. It is preferred that at least one of the carboalkoxy groups be in the para position with respect to the carbons attached to the internal imide, and especially preferred that both are in the para or 4(4') position for particularly desirable high temperature properties in the polymer.

The aromatic dicarboxylic acid is prepared by condensing a benzene tricarboxylic acid anhydride or its acid with aminobenzoic acid. Suitable reactants include trimellitic anhydride, trimellitic acid, hemimellitic anhydride, and the like; and ortho, meta or para amino-benzoic acid. Naturally, mixtures of these reactants may also be employed. The reactants may be substituted or unsubstituted. The desired substituents do not enter into the condensation reaction. The process for preparing the aromatic dicarboxylic acid comprises reacting the benzene tricarboxylic acid anhydride and aminobenzoic acid at an elevated temperature for a sufficient time to produce the dicarboxylic acid. Typically, with trimellitic anhydride and p-aminobenzoic acid, the reaction proceeds at a temperature in the order of 270° F. although somewhat lower temperatures are also suitable. The time sufficient to produce the dicarboxylic acid is in the order of 2½ hours when the temperature is gradually raised up to 270° F. Suitable solvents such as dimethylformamide are generally employed. Naturally, when the acid (trimellitic acid) is utlized, greater condensation conditions are required.

When such solvents as dimethylformamide are present, the p,p'-aromatic dicarboxylic acid precipitates out of the solution. It is then normally washed with water and filtered. Other of the acids may be recovered in the same or similar manner.

The polyester-imide is prepared in the polycondensation reaction of the aromatic dicarboxylic acid and the defined dihydric alcohol. Typically, for N-(p-carboxylphenyl) trimellitimide and ethylene glycol, the reactants are first heated by an ethylene glycol vapor bath, after which small amounts of catalyst such as zinc acetate and antimony trioxide are added. Vacuum is then usually applied and the heating continued for periods of time in the order of 2 hours. A dimethylphthalate vapor bath is usually then employed to remove unreacted ethylene glycol and the heating continued for approximately 1 hour. During this procedure, the polymer solidifies. It is then cooled. When particular polymers, surface coatings, or fibers are desired, these procedures may be modified by techniques normally utilized for the particular product by those skilled in the art.

The defined aromatic dicarboxylic acid may be used in conjuction with other acids such as terephthalic acid in preparing polyesterimides. In addition to its benefits afforded the polymers at higher temperatures, it offers advantages for fibers which are dyed.

The following examples illustrate some embodiments of this invention. These are intended for illustrative purposes only and are not intended to limit the scope of the invention.

Example I

Approximately 6.0 moles (1,152 gm.) of trimellitic anhydride, 6.0 moles (822 gm.) of p-aminobenzoic acid, and 3,000 ml. of dimethylformamide were charged to a reaction flask. A mild exothermic reaction was noted. Heat was then applied during which the contents were stirred. The reaction temperature was gradually raised until it reached approximately 270° F. after approximately 2½ hours of heating. A precipitate then formed, making stirring impossible. Approximately 3,000 ml. of additional DMF were added to the contents of the flask for easier handling. The product was then added to four volumes of water and was then filtered. The crude, dried product was light yellow and weighed approximately 1,500 gm. The color was improved by washing with glacial acetic acid. An Acid Number 540 (mg. KOH/gm.) was determined which checked with the theoretical value of 540 (for a tricarboxylic acid). The product was N-(p-carboxyphenyl) trimellitimide.

Example II 15.6 grams of N-(p-carboxyphenyl) trimellitimide and 62 grams of ethylene glycol were stirred, sparged with nitrogen and heated for 2½ hours. At the end of this time, the N-(p-carboxyphenyl) trimellitimide appeared to be partially dissolved in the ethylene glycol. 0.01 g. of zinc acetate and 0.01 gram of antimonytrioxide were added to the mixture which was then stirred and heated in an ethylene glycol vapor bath under vacuum with a nitrogen bleed for two hours. The ethylene glycol vapor bath was replaced with a dimethyl phthalate vapor bath and heating was continued for five hours. At this stage the reaction mixture was partly solid and partly liquid. The dimethyl phthalate vapor bath was replaced with an anthracene vapor bath and heating was continued for five hours. A solid product was obtained. The melting point of the product was 290–360° C. The infra-red diagram indicates that the product is a polyester polymer. See attached FIGURE 1.

The important absorption bands for the polymer are 5.60, 5.80, 7.26 microns for the cyclic imide units and 5.80, 7.90, 8.26 microns for the aryl esters and 13.86 microns due to deformational vibration of the cyclic imide.

Example III

A polyester-imide was prepared from the dicarboxylic acid (15.6 gm.) of Example I and ethylene glycol (9.5 gm.). As indicated from these amounts, an excess of the glycol was utilized. The reactants were charged to a glass polyesterification apparatus which was equipped with facilities for operating with vacuum and stirring. The latter was made from glass capillary tubing which provided a means to sprage the polymer with nitrogen.

After being swept with nitrogen, the reactants were heated for approximately one hour by an ethylene glycol vapor bath. Then 0.1 gm. each of zinc acetate and antimony trioxide were added. Next, vacuum was slowly applied and the heating was continued for approximately two additional hours during which the acid dissolved. The ethylene glycol vapor bath was then replaced with a dimethylphthalate vapor bath. Heating was then continued for approximately one additional hour during which the polyester-imide solidified. The contents of the glass reactor were cooled and the solid polymer removed by separating the reactor. The polymer was a very hard, yellow product. It melted at 325° C. which is substantially above the melting temperature of 256° C. characteristic of polyesters from terephthalic acid and ethylene glycol.

The above disclosure reveals that applicants have provided an aromatic dicarboxylic and polyester-imide which exhibit many features desirable for commercial products.

Thus, having described the invention, what is claimed is:

1. A polymeric polyester imide of components consisting of N-(p-carboxyphenyl) trimellitimide and a saturated dihydric alcohol having from 2 to 4 carbon atoms.

2. The polymeric polyester-imide having the formula:

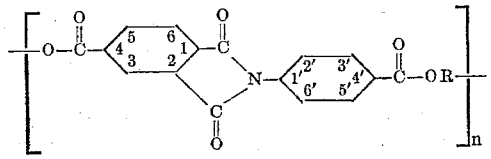

where $n$ is greater than 1 and wherein R is a divalent ethylene radical.

References Cited

UNITED STATES PATENTS

| | | | |
|---|---|---|---|
| 2,556,664 | 6/1951 | Smith et al. | 260—326 |
| 2,997,462 | 8/1961 | Wulff et al. | 260—75 |
| 3,051,724 | 8/1962 | Bolton et al. | 260—326 |
| 3,060,152 | 10/1962 | Ringwald | 260—75 |
| 3,060,191 | 10/1962 | Kolb et al. | 260—326 |
| 3,078,228 | 2/1963 | Smith et al. | 260—326 |
| 3,122,559 | 2/1964 | Bolton et al. | 260—326 |
| 3,217,014 | 11/1965 | Van Strien et al. | 260—326 |

WILLIAM H. SHORT, *Primary Examiner.*

L. P. QUAST, *Assistant Examiner.*